US008140120B2

(12) United States Patent
Ji

(10) Patent No.: US 8,140,120 B2
(45) Date of Patent: Mar. 20, 2012

(54) APPARATUS AND METHOD FOR PROVIDING NETWORK SERVICE IN A PORTABLE COMMUNICATION SYSTEM

(75) Inventor: Hyun-Goo Ji, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 363 days.

(21) Appl. No.: 12/437,131

(22) Filed: May 7, 2009

(65) Prior Publication Data

US 2009/0325572 A1 Dec. 31, 2009

(30) Foreign Application Priority Data

Jun. 26, 2008 (KR) .................. 10-2008-0060832

(51) Int. Cl.
*H04B 1/38* (2006.01)
(52) U.S. Cl. ............. 455/558; 455/557; 455/556.2; 455/552.1; 455/67.11; 455/550.1
(58) Field of Classification Search ........... 455/558, 455/557, 556.2, 550.1, 566.2, 522.1, 67.11, 455/68
See application file for complete search history.

(56) References Cited

U.S. PATENT DOCUMENTS

| 6,591,116 | B1 * | 7/2003 | Laurila et al. ............... 455/558 |
| 7,263,355 | B2 * | 8/2007 | Morikawa et al. ........... 455/424 |
| 2005/0176466 | A1 * | 8/2005 | Verloop et al. .............. 455/558 |
| 2009/0143020 | A1 * | 6/2009 | Kotabe et al. ............. 455/67.11 |
| 2009/0305672 | A1 * | 12/2009 | Bennett ...................... 455/411 |
| 2011/0086609 | A1 * | 4/2011 | Buehler et al. ........... 455/404.2 |

FOREIGN PATENT DOCUMENTS

| KR | 10-2005-0052967 A | 6/2005 |
| KR | 10-0793093 B1 | 1/2008 |
| KR | 10-0811521 | 3/2008 |
| KR | 10-0811521 B1 | 3/2008 |
| KR | 1020060104362 * | 3/2008 |

* cited by examiner

*Primary Examiner* — Ajit Patel
*Assistant Examiner* — Khai M Nguyen
(74) *Attorney, Agent, or Firm* — Jefferson IP Law, LLP

(57) ABSTRACT

An apparatus and method for providing a network service in a portable communication system are provided. A portable terminal for providing a network service includes at least two Subscriber Identity Module (SIM) cards for supporting networks different from each other, a network performance testing unit for measuring performance of network servers supported by the SIM cards, and a controller for identifying the performance of the network servers measured by the network performance testing unit and for selecting a SIM card supporting a network server having better performance.

8 Claims, 3 Drawing Sheets

APPARATUS AND METHOD FOR PROVIDING NETWORK SERVICE IN A PORTABLE COMMUNICATION SYSTEM

PRIORITY

This application claims the benefit under 35 U.S.C. §119(a) of a Korean patent application filed in the Korean Intellectual Property Office on Jun. 26, 2008 and assigned Serial No. 10-2008-0060832, the entire disclosure of which is hereby incorporated by reference.

BACKGROUND OF THE INVENTION

1. Field of the Invention

The present invention relates to an apparatus and method for measuring network performance of a corresponding mode in a dual mode portable terminal that supports two operation modes. More particularly, the present invention relates to an apparatus and method for measuring performance of a corresponding network and selecting a network having better performance in the portable terminal, before driving an application using a network.

2. Description of the Related Art

With recent developments of mobile communication technologies, a mobile communication system has evolved from the wireless-centered $2^{nd}$ Generation (2G) mobile communication service into the current $3^{rd}$ Generation (3G) mobile communication service that enables Internet and multimedia services based on wired-wireless integration. Presently, the 3G mobile communication service is being developed into a $4^{th}$ Generation (4G) mobile communication service that has features such as high speed Internet, large capacity communications, and service mobility.

An advantage of the new and various mobile communication services is the provision of various supplementary services along with the ability to provide anyone with service at anytime and in any place. Together with the evolution of these mobile communication services, the advance of portable terminal technology is being made steadily. For example, a multi mode portable terminal that enables the use of a mobile communication function and a portable Internet function is now available. Thus, a user can be provided with several service providers' services using the multi mode portable terminal. As a result, a user may select a service provider depending on conditions such as service rates and service quality.

Such portable terminals are providing services associated with a network such as an Electronic mail (E-mail) service, a Multimedia Message Service (MMS), a Java application service, and a streaming service.

The services related with the network as described above have different quality of service provisions depending on performance of a corresponding network.

However, current mobile communication systems do not identify performance of a network before providing a network-related service. Therefore, a service is provided by a network that is already in connection irrespective of performance of the network. For example, it is assumed that the multi-mode portable terminal uses a service of service provider 'A' and a service of service provider 'B,' and presently uses a streaming service in a state using the service of service provider 'A'. Also, it is assumed that network performance of service provider 'B' is excellent in providing a streaming service, such that, if the portable terminal uses the streaming service provided by service provider 'B', the service quality is better than that provided by service provider 'A'. However, because the portable terminal executes its function using the service provider currently in use, irrespective of performance of a network provided by each service provider, the portable terminal may be provided with lower quality service.

Thus, a need exists for an apparatus and method for measuring performance of a network providing a service, selecting a network of better performance, and providing the service, when intending to use a network-related service in the portable terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and method for measuring performance of a network providing a service in a multi mode portable terminal.

Another aspect of the present invention is to provide an apparatus and method for selecting a network having better network performance and for providing a service in a multi mode portable terminal.

A further aspect of the present invention is to provide an apparatus and method for providing a network service of improved quality in a multi mode portable terminal.

In accordance with an aspect of the present invention, a portable terminal for providing a network service is provided. The terminal includes at least two Subscriber Identity Module (SIM) cards for supporting networks different from each other, a network performance testing unit for measuring performance of network servers supported by the SIM cards, and a controller for identifying the performance of the network servers measured by the network performance testing unit and for selecting a SIM card supporting a network server having better performance.

In accordance with another aspect of the present invention, a method for providing a network service in a portable terminal is provided. The method includes selecting at least two SIM cards supporting networks different from each other and measuring performance of a network server providing the network service, selecting a first SIM card supporting a network server with performance not measured and measuring the performance of the network server providing the network service, and selecting a second SIM card supporting a network server having better performance among the measured performance of the network servers.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description when taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention include an apparatus and method for measuring performance of a corresponding network and selecting a network having better performance among networks supported by the portable terminal, before driving an application using the network in the portable terminal, are described below.

Figure 1:
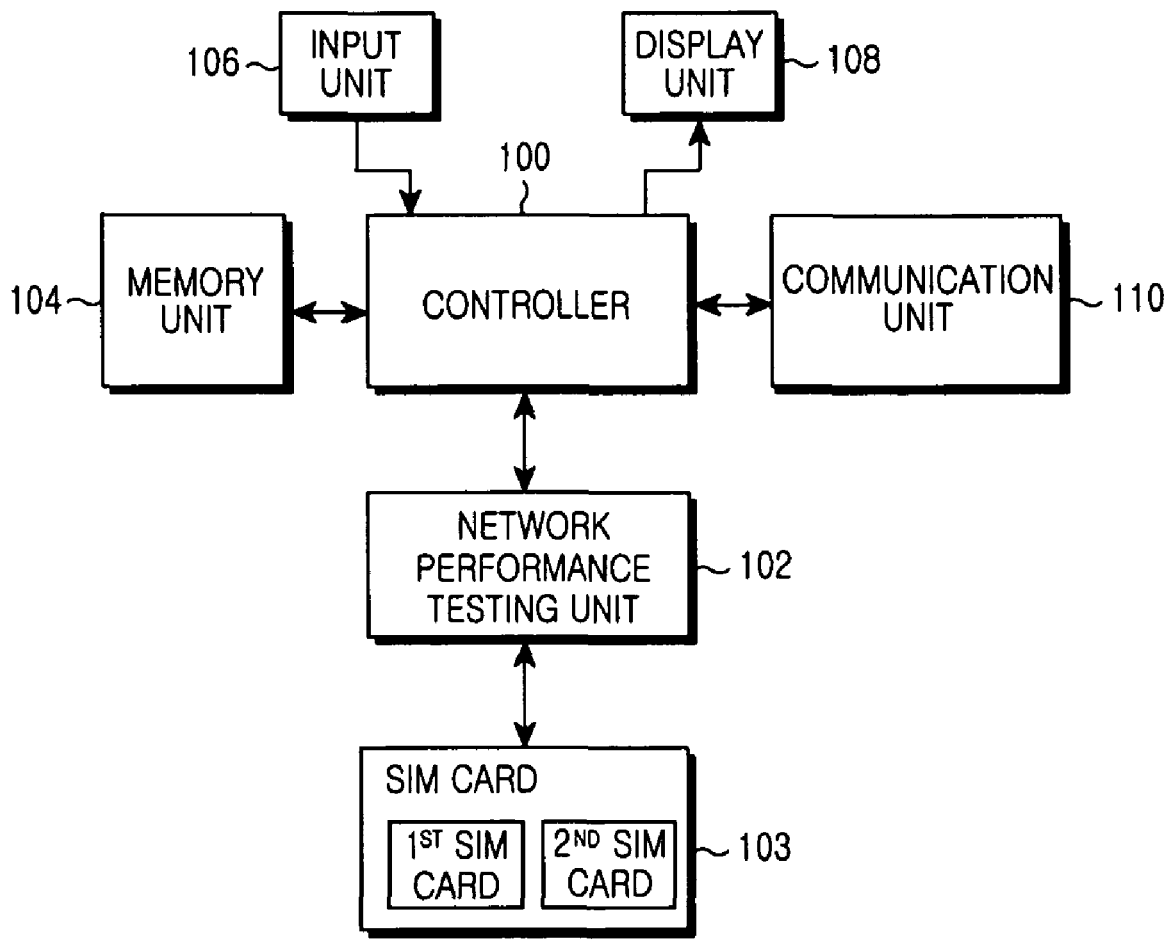
FIG. 1 is a block diagram illustrating a construction of a portable terminal for selecting a Subscriber Identity Module (SIM) card having better network performance according to an exemplary embodiment of the present invention.

FIG. 1 is a block diagram illustrating a construction of a portable terminal for selecting a Subscriber Identity Module (SIM) card having better network performance according to an exemplary embodiment of the present invention.

Referring to FIG. 1, the portable terminal includes a controller 100, a network performance testing unit 102, a SIM card 103, a memory unit 104, an input unit 106, a display unit 108 and a communication unit 110. In the illustrated exemplary embodiment, the SIM card 103 includes a first SIM card and a second SIM card. The first SIM card and the second SIM card are respectively associated with two networks that the portable terminal supports. Alternatively, the portable terminal may include a single SIM card that alone supports two networks. The controller 100 of the portable terminal performs a general operation of the portable terminal, e.g., a process and control for voice telephony and data communication. In an exemplary implementation, the controller 100 controls the network performance testing unit 102 and performs a process to measure performance of a network supported by the SIM card 103 provided in the portable terminal.

Thus, the controller 100 selects the SIM card 103 supporting a network having better performance among network performance measured by the network performance testing unit 102 and performs a process to drive an application for the network.

Under control of the controller 100, the network performance testing unit 102 transmits a test signal for measuring performance of a network corresponding to each SIM card 103 to a server of the network, receives a reply from the network server and measures performance of the network server.

An exemplary operation of the network performance testing unit 102 is described below.

Prior to a description of the operation of the network performance testing unit 102, the portable terminal is assumed to include two SIM cards (i.e., a first SIM card and a second SIM card). The network performance testing unit 102 selects one SIM card (i.e., the first SIM card) among the two SIM cards, transmits a test signal to a network server supported by the selected first SIM card and receives a reply to the test signal from the network server. The network performance testing unit 102 then selects another SIM card (i.e., the second SIM card), transmits a test signal to a network server supported by the selected second SIM card and receives a reply to the test signal from the network server.

The network performance testing unit 102 receiving the two replies to the test signals may compare reception time of the received two replies with each other, measure performance of the network servers, and provide the measured performance result to the controller 100. That is, if the reply through the first SIM card is faster than the reply through the second SIM card, the network performance testing unit 102 determines that performance of a network through the first SIM card is better than performance of a network through the second SIM card.

The SIM card 103 may be detachable from the portable terminal. The SIM card 103 may be a medium (e.g., a smart card and the like) having its own micro processor and memory chip, and may store various user information. The SIM card 103 performs data communication with the portable terminal through a SIM Application Toolkit (SAT). The SAT is a series of commands and procedures for allowing a network manager to provide his/her own service to a portable terminal user. In an exemplary implementation, the SIM card 103 communicates with the portable terminal using the SAT for transmitting/receiving information for measurement of performance of the network. As illustrated in FIG. 1, the SIM card 103 may include two or more SIM cards and may be mountable.

The memory unit 104 may include a Read Only Memory (ROM), a Random Access Memory (RAM) and a flash ROM. The ROM may store a program for processing and controlling the controller 100 and the network performance testing unit 102, and various reference data.

The RAM may be a working memory of the controller 100 and temporarily stores data generated in execution of various programs. The flash ROM stores various data which needs preserving and may be updated, such as a phone book, an outgoing message, an incoming message and the like.

The input unit 106 includes numeral key buttons '0' to '9', a menu button, a cancel button (delete), an OK button, a talk button, an end button, an Internet button, navigation key (or direction key) buttons, a plurality of function keys such as a character input key and the like. The input unit 106 provides key input data (e.g., a network performance test request and the like) corresponding to a key pressed by a user to the controller 100.

The display unit 108 displays state information generated during operation of the portable terminal, limited number of characters, a large amount of moving pictures and still pictures and the like. The display unit 108 may include a color Liquid Crystal Display (LCD). If the LCD is provided as a touch screen, the display unit 108 may perform a part or all of the functions of the input unit 106.

The communication unit 110 performs a function of transmitting/receiving and processing a wireless signal of data input/output through an antenna (not illustrated). For example, in a transmission mode, the communication unit 110 performs a function of channel-coding and spreading data to be transmitted. The communication unit 110 then performs Radio Frequency (RF) processing and transmitting of the data. In a reception mode, the communication unit 110 performs a function of converting a received RF signal into a baseband signal, de-spreading and channel-decoding the baseband signal, and restoring data. In an exemplary implementation, the communication unit 110 performs a function of transmitting/receiving a message corresponding to area information.

A function of the network performance testing unit 102 may be implemented by the controller 100 of the portable terminal. However, exemplary embodiments of the present invention are not limited thereto. For example, the controller 100 may be implemented to process all functions of the portable terminal.

An exemplary apparatus for measuring performance of a corresponding network and selecting a network having better performance, before driving an application using a network, in a portable terminal is described above. An exemplary method for measuring performance of a corresponding network and selecting a network having better performance, before driving an application using a network, is described below.

Figure 2:
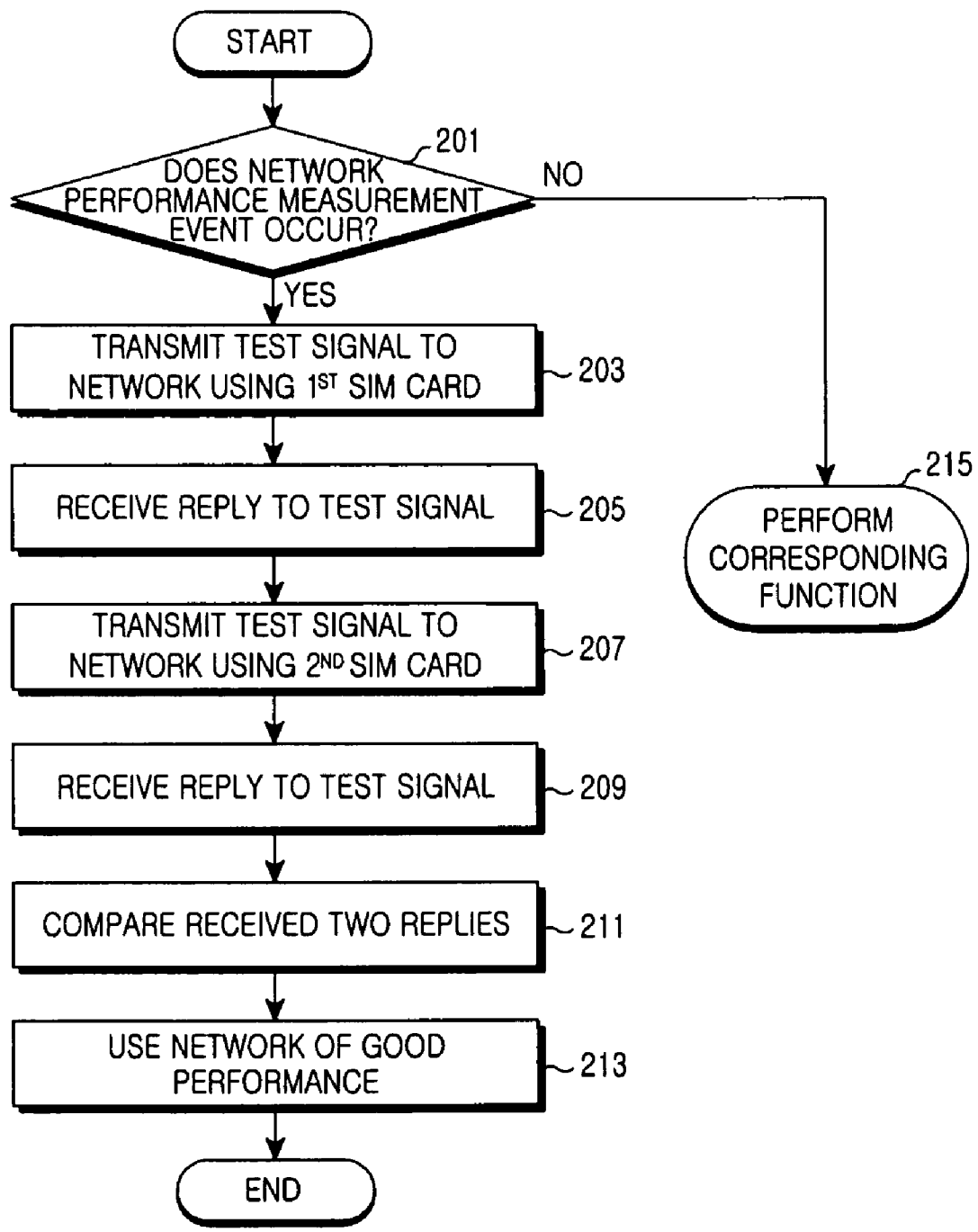
FIG. 2 is a flow diagram illustrating a process for selecting a SIM card having better network performance in a portable terminal according to an exemplary embodiment of the present invention.

FIG. 2 is a flow diagram illustrating a process for selecting a SIM card having better network performance in a portable terminal according to an exemplary embodiment of the present invention.

Referring to FIG. 2, in step 201, the portable terminal determines if a network performance measurement event is generated. The network performance measurement event may be a process for measuring the respective performance of each network corresponding to a SIM card in a portable terminal supporting two or more SIM cards in order to select the SIM card supporting the network having better performance. If performing an application using a network, the network performance measurement event may automatically measure performance of a network at the time of executing the corresponding application.

If the network performance measurement event is not generated, in step 215, the portable terminal performs a corresponding function (e.g., an idle mode).

If the network performance measurement event is generated, the portable terminal proceeds to step 203 and transmits a test signal to a server of a network supporting a first SIM card. In step 205, the portable terminal receives a reply to the test signal from the network server.

In step 207, the portable terminal transmits a test signal to a network server supporting a second SIM card. In step 209, the portable terminal receives a reply to the test signal from the network server.

In the illustrated example, that the portable terminal includes two SIM cards so that the portable terminal transmits test signals for performance measurement for the network respectively associated with the first SIM card and the second SIM card. However, the invention is not limited to two networks and the portable terminal may perform a process to transmit test signals to a number of networks corresponding to the number of SIM cards.

In step 211, the portable terminal compares the reply signals of the test signals transmitted for performance measurement for the networks and determines the performance of the respective networks. For example, the portable terminal uses respective wireless networks using two SIM cards. Before driving an application, the portable terminal may test performance of the networks in a similar method with a ping test used in a general personal computer.

In step 213, the portable terminal selects a SIM card associated with the network having better performance among the respective networks determined in step 211 and performs a process to use the selected network.

That is, if the reply received from the network server supporting the first SIM card is determined to be faster than the reply received from the network server supporting the second SIM card in step 211, the portable terminal determines that performance of the network supporting the first SIM card is better. Inversely, if the reply received from the network server supporting the first SIM card is determined to be slower than the reply received from the network server supporting the second SIM card, the portable terminal determines that performance of the network supporting the second SIM card is better.

The portable terminal then terminates the process according to an exemplary embodiment of the present invention.

Figure 3:
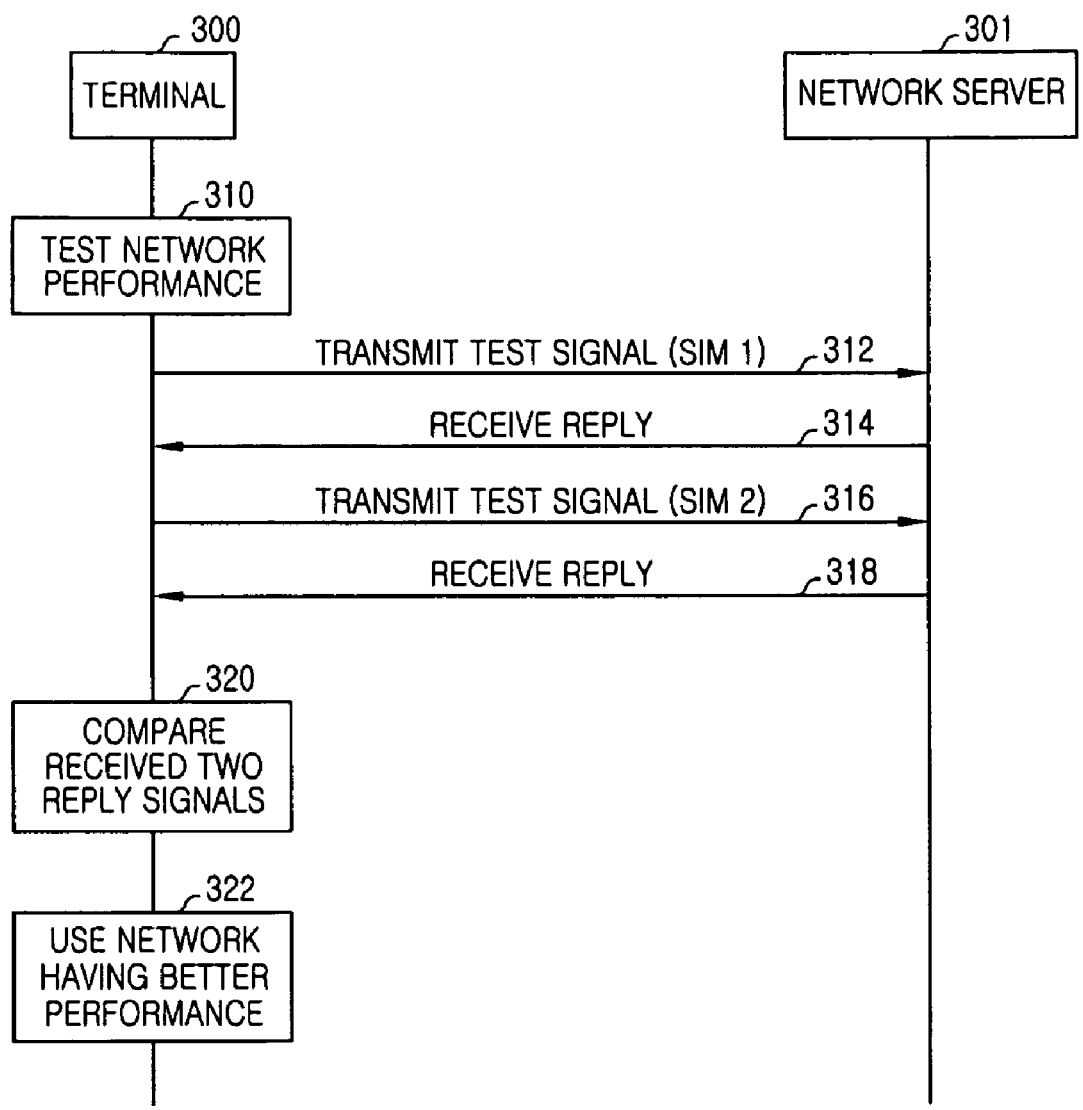
FIG. 3 is a ladder diagram illustrating a process for selecting a SIM card having better network performance in a portable communication system according to an exemplary embodiment of the present invention.

FIG. 3 is a ladder diagram illustrating a process for selecting a SIM card having better network performance in a portable communication system according to an exemplary embodiment of the present invention.

Referring to FIG. 3, the portable communication system may include a portable terminal 300 and a network server 301. The network server 301 generically refers to a network server supporting a SIM card provided in the portable terminal.

In step 310, if the portable terminal intends to test network performance, that is, if the portable terminal intends to identify a network having better performance among networks supported by SIM cards mounted in the portable terminal 300, in step 312, the portable terminal 300 transmits a test signal to the network server 301 through a first SIM card. The test signal transmitted by the portable terminal 300 refers to a signal for measuring performance of the network that uses the SIM card provided in the portable terminal.

The network server 301 receiving the test signal transmitted by the portable terminal 300 transmits a reply to the test signal. Thus, in step 314, the portable terminal 300 receives the reply signal to the test signal from the network server 301.

In step 316, the portable terminal 300 transmits a test signal to the network server 301 associated with a second SIM card to measure network performance for the second SIM card. Then, in step 318, the portable terminal 300 receives a reply to the test signal from the network server 301.

In more detail, the network servers are networks each supporting a SIM card. Assuming that the portable terminal includes a first SIM card and a second SIM card and a first network supported by the first SIM card and a second network supported by the second SIM card exist, the portable terminal transmits a test signal to the first network and receives a reply to the test signal. The portable terminal then transmits a test signal to the second network and receives a reply to the test signal. Thus, the portable terminal may be capable of measuring performance of the first network and the second network supported by the first SIM card and the second SIM card, respectively. A process for measuring network performance in the portable terminal 300 may be described, for example, by a ping test implemented in a personal computer.

That is, the portable terminal 300 transmits a test signal (e.g., a ping) to the network server 301 through one SIM card in order to measure network performance. The test signal may be transmitted to the network server 301 through a wireless network and a wired network.

The network server 301 receiving the test signal transmits a reply signal (e.g., a ping reply) to the test signal, to the portable terminal 300 through the wired network and the wireless network.

As described above, the portable terminal 300 performs a network performance measurement process with every SIM card.

The portable terminal 300 then receives replies to the test signals corresponding to the respective SIM cards, identifies network performance, and selects a network having better performance.

That is, in step 320, the portable terminal 300 may compare reception times of the test signal replies transmitted from the network server 301 and measure network performance. In step 322, the portable terminal 300 may perform a process to drive an application using a network, by using a SIM card having better network performance.

As described above, exemplary embodiments of the present invention may provide a network service with improved quality by measuring network performance, selecting a network having better performance and providing a network service in a multi mode portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal for providing a network service, the terminal comprising:
    at least two Subscriber Identity Module (SIM) cards for supporting networks different from each other;
    a network performance testing unit for measuring performance of network servers supported by the SIM cards; and
    a controller for identifying the performance of the network servers measured by the network performance testing unit by transmitting test signals to the network servers supported by respective SIM cards, receiving replies to the test signals from the network servers and comparing reception times of the test signal replies corresponding to the respective SIM cards, and for selecting a SIM card supporting a network server having better performance.

2. The terminal of claim 1, wherein, after selecting the SIM card supporting the network server having better performance, the controller performs a process provided with the network service through the selected SIM card.

3. The terminal of claim 1, wherein the performance of the network server supporting one of the SIM cards is better, if the test signal reply supporting the SIM card is faster than the test signal reply of another SIM card.

4. The terminal of claim 3, wherein the performance of the network server supporting the other SIM card is better, if the test signal reply supporting the SIM card is slower than the test signal reply supporting the other SIM card.

5. A method for providing a network service in a portable terminal, the method comprising:
    selecting at least two SIM card supporting networks different from each other and measuring performance of a network server providing the network service by transmitting test signals to network servers supported by respective SIM cards, receiving replies to the test signals from the network servers and comparing reception times of the test signals replies for respective SIM cards;
    selecting a first SIM card supporting a network server with performance not measured and measuring the performance of the network server providing the network service; and
    selecting a second SIM card supporting a network server having better performance among the measured performance of the network servers.

6. The method of claim 5, further comprising, after selecting the second SIM card supporting the network server having better performance, providing the network service through the selected second SIM card.

7. The method of claim 5, wherein the performance of the network server supporting the first SIM card is better, if the test signal reply supporting the first SIM card is faster than the test signal reply of the second SIM card.

8. The method of claim 7, wherein the performance of the network server supporting the second SIM card is better, if the test signal reply supporting the first SIM card is slower than the test signal reply supporting the second SIM card.

* * * * *